US012425124B2

(12) United States Patent
Sun et al.

(10) Patent No.: US 12,425,124 B2
(45) Date of Patent: Sep. 23, 2025

(54) DATA FORWARDING METHOD AND APPARATUS IN BLUETOOTH MESH NETWORK (71) Applicant: NANJING SILERGY MICRO TECHNOLOGY CO., LTD., Jiangsu (CN)

(72) Inventors: Zhongjie Sun, Jiangsu (CN); Cheng Liang, Jiangsu (CN)

(73) Assignee: NANJING SILERGY MICRO TECHNOLOGY CO., LTD., Jiangsu (CN)

( * ) Notice: Subject to any disclaimer, the term of this patent is extended or adjusted under 35 U.S.C. 154(b) by 740 days.

(21) Appl. No.: 17/735,614

(22) Filed: May 3, 2022

(65) Prior Publication Data
US 2022/0376814 A1 Nov. 24, 2022

(30) Foreign Application Priority Data

May 20, 2021 (CN) .......................... 202110554207.3

(51) Int. Cl.
*H04L 1/00* (2006.01)
*H04L 65/1066* (2022.01)
*H04W 4/80* (2018.01)
*H04W 28/02* (2009.01)

(52) U.S. Cl.
CPC ............ *H04L 1/0002* (2013.01); *H04L 1/003* (2013.01); *H04L 65/1066* (2013.01); *H04W 4/80* (2018.02); *H04W 28/0215* (2013.01)

(58) Field of Classification Search
CPC ... H04L 1/0002; H04L 1/003; H04L 65/1066; H04L 1/0009; H04L 2001/0097; H04W 4/80; H04W 28/0215; H04W 28/021; H04W 28/0289; H04W 28/06; H04W 72/535; H04W 84/18; Y02D 30/70
See application file for complete search history.

(56) References Cited

U.S. PATENT DOCUMENTS

| 6,081,720 | A | * | 6/2000 | Sampson | H04W 72/12 455/450 |
| 9,754,096 | B2 | * | 9/2017 | Scagnol | H04W 12/50 |
| 2011/0110253 | A1 | * | 5/2011 | Ahn | H04L 47/125 370/252 |
| 2017/0317952 | A1 | * | 11/2017 | Sillankorva | H04L 47/263 |
| 2018/0139683 | A1 | * | 5/2018 | Kwon | H04W 40/22 |

* cited by examiner

*Primary Examiner* — Kabir A Timory
(74) *Attorney, Agent, or Firm* — Ohlandt, Greeley and Perle, L.L.P.

(57) ABSTRACT

A data forwarding method and apparatus in a Bluetooth Mesh network are disclosed. According to the present disclosure, on the basis of not changing the original Bluetooth protocol, switching is performed to transmit the forwarded data at different transmission rates multiple times. The transmission distance difference between different transmission rates is used to achieve regional flood forwarding, thereby reducing a large number of flooding of device nodes in the network and avoiding network congestion, and improving the performance of the entire Bluetooth Mesh network.

19 Claims, 3 Drawing Sheets

Figure 1:
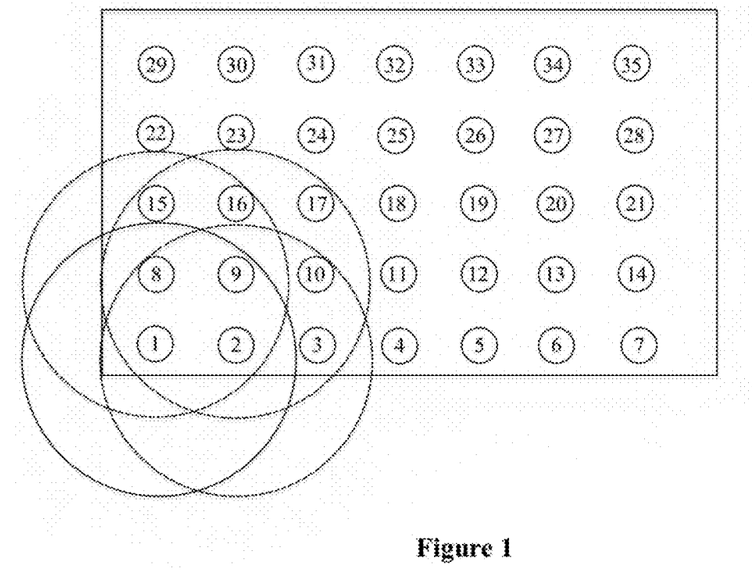
FIG. 1 is a schematic diagram illustrating a flood forwarding method in a Bluetooth Mesh network in the conventional technology.

Figure 5 ing method in a Bluetooth Mesh network in the conventional technology. As shown in FIG. 1, the packets of the network layer are all sent and forwarded by broadcasting. In the Bluetooth Mesh network, each of nodes represents a BLE device, which may also serve as a router. Each of nodes in the network may transmit and receive signals, and may communicate directly with one or more peer nodes. For example, a node 1 is an initial node for forwarding data, and nodes 2, 8, and 9 are all within a transmission range thereof. After receiving the forwarded data, the nodes 2, 8, and 9 directly forward data. Finally, nodes 3, 10, 15, 16, and 17 receive the data forwarded by the nodes 2, 8, and 9, and continue to forward data in this way. As can be seen from FIG. 1, as more and more nodes receive the forwarded data, the number of devices for forwarding next time also increases in a flooded manner.

DATA FORWARDING METHOD AND APPARATUS IN BLUETOOTH MESH NETWORK

This application claims priority to Chinese Patent Application No. 202110554207.3, titled "DATA FORWARDING METHOD AND APPARATUS IN BLUETOOTH MESH NETWORK", filed on May 20, 2021 with the China National Intellectual Property Administration, which is hereby incorporated by reference in its entirety.

FIELD

The present disclosure relates to the technical field of wireless communication, and in particular, to a data forwarding method and a data forwarding apparatus in a Bluetooth Mesh network.

BACKGROUND

Bluetooth Low Energy (BLE) is one of wireless communication technologies, which has the features of low power consumption, short distance and high security. Thus, BLE is widely used in the field of Internet of Things. In 2017, the Bluetooth Special Interest Group released Bluetooth Mesh standard specification, which improved networking capabilities of BLE technology. The Bluetooth Mesh network is a topology network established by multiple BLE devices, and each of nodes in the network has the function of forwarding messages. At present, the Bluetooth Mesh standard adopts a simple flooding forwarding mechanism. FIG. 1 is a schematic diagram illustrating a flood forward- Therefore, this simple flooding causes a large number of nodes in the network to forward data simultaneously, thereby resulting in network congestion and deteriorating the performance of the entire network sharply.

In order to solve the problem of forwarding simultaneously by a large number of nodes, and ensure normal forwarding of devices in the network, the method adopted in the conventional technology is to set a random delay for each forwarding node. That is, after receiving the forwarded data, the node may delay the transmission of the forwarded data in a certain period. This method can reduce the problem of forwarding simultaneously by a large number of nodes to a certain extent. However, this method does not consider the problem of power consumption of the device. The delayed forwarding of a large number of nodes inevitably wastes the power consumption of device nodes.

Another method adopted in the conventional technology is to set a forwarding range D max and D min for the node and then convert the received RSSI into a distance value D. If the distance value D is in this forwarding range, it is considered that the forwarding rule is met. This method can reduce the number of nodes for forwarding simultaneously, thereby reducing the power consumption of the system. However, in practical applications, the setting of forwarding range for each of device nodes needs to be written in advance.

SUMMARY

In view of this, the present disclosure is to provide a flood forwarding method and a flood forwarding apparatus in a Bluetooth Mesh network. Switching is performed to transmit the forwarded data multiple times at different transmission rates. The transmission distance difference between data transmitted at different transmission rates is used to achieve regional flood forwarding, thereby reducing a large number of flooding of device nodes in the network and avoiding network congestion, and improving the performance of the entire Bluetooth Mesh network.

In a first aspect, a forwarding data method in a Bluetooth Mesh network is provided according to an embodiment of the present disclosure. The data forwarding method includes:

receiving packets forwarded at different transmission rates; and adjusting a relay state of a current node based on transmission rates of received packets with a same identifier.

In an embodiment, the method further includes:

determining whether packets with the same identifier have different transmission rates;

if the received packets with the same identifier only have a single transmission rate, enabling a relay by the current node to forward the packets with the identifier; and if the received packets with the same identifier have different transmission rates, disabling the relay by the current node to discard the packets with the identifier.

In an embodiment, the packet is repeatedly forwarded 2N times by a same node at different transmission rates to avoid packet loss during transmission, where N is a positive integer.

In an embodiment, the packet is forwarded N times by the same node at a first rate, and the packet is forwarded N times by the same node at a coding rate.

In an embodiment, the packet is forwarded N times by the same node at the first rate, and then forwarded N times by the same node at the coding rate.

In an embodiment, the first rate is greater than the coding rate, and a transmission range of the packets forwarded at the first rate is smaller than a transmission range of the packets forwarded at the coding rate.

In an embodiment, a format of the packet includes a flag bit, where the flay bit indicates a transmission rate of the current node next time the packet is forwarded.

In an embodiment, the flag bit being a first value indicates that a first rate is used to forward the packet next time; and the flag bit being a second value indicates that a coding rate is used to forward the data packet next time.

In an embodiment, a default field is used as the flag bit to indicate that one of the first rate and the coding rate is used to forward the packet next time.

In an embodiment, when a value of the flag bit in the packet sent by the current node is changed, other node switches the reception rate to a transmission rate indicated by the flag bit after receiving the packet.

In an embodiment, the method further includes:

recording an identifier and a transmission rate of a currently received packet;

comparing the transmission rate of the currently received packet and a transmission rate corresponding to received packets with the same identifier as the currently received packet; and determining, based on a comparison result, whether the current node is to forward packets with the identifier.

In an embodiment, the method further includes:

if the transmission rate corresponding to the received packets with the identifier is different from the transmission rate of the currently received packet, forwarding no packet with the identifier by the current node;

if the transmission rate corresponding to the received packets with the identifier is the same as the transmission rate of the currently received packet, determining whether the packets with the identifier are to be forwarded or not, in response to a determination that the packets with the identifier have been forwarded.

In an embodiment, if it is determined that the packets with the identifier have not been forwarded, a transmission rate of a next received packet with the identifier is compared with the transmission rate corresponding to the received packets with the same identifier; if it is determined that the packets with the identifier have been forwarded, it is indicated that the packets with the identifier have the single transmission rate, the current node is instructed to forward the packets with the identifier.

In an embodiment, the method further includes:

when the transmission rate of the currently received packet is a first rate, searching for whether a packet with the same identifier as the currently received packet and the transmission rate being the coding rate has been received;

if the packet with the same identifier as the currently received packet and the transmission rate being the coding rate is found, forwarding no packet with the identifier by the current node; and if no packet with the same identifier as the currently received packet and the transmission rate being the coding rate is found, determining whether the packets with the identifier have been forwarded.

In an embodiment, the method further includes:

when the transmission rate of the currently received packet is a coding rate, searching for whether a packet with the same identifier as the currently received packet and the transmission rate being a first rate has been received;

if a packet with the same identifier as the currently received packet and the transmission rate being the first rate is found, forwarding no packet with the identifier by the current node; and if no packet with the same identifier as the currently received packet and the transmission rate being the first rate is found, determining whether the packets with the identifier has been forwarded.

In an embodiment, when the packet with the identifier is forwarded 2N times by a same node, it is indicated that the packets with the identifier have been forwarded, where N is a positive integer.

In an embodiment, determining whether the packets with the identifier have been forwarded includes:

starting a timer corresponding to the packets with the identifier for timing;

if the timing is greater than a preset time of the timer, indicating that the packets with the identifier have been forwarded.

In an embodiment, the preset time of the timer is set to be greater than a time for forwarding the packet with the identifier (2N−1) times.

In a second aspect, a data forwarding apparatus in a Bluetooth Mesh network is provided according to embodiments of the present disclosure. The data forwarding apparatus includes:

a transmission rate acquisition module configured to acquire identifiers of currently received packets and transmission rates corresponding to the currently received packets; and an adjustment module configured to adjust a relay state based on the transmission rates of the currently received packets with a same identifier.

In an embodiment, the adjustment module is configured to adjust the relay state by: if the received packets with the same identifier have different transmission rates, disabling a relay by a current node to discard the packets with the identifier; if the received packets with the same identifier only have a single transmission rate, enabling the relay by the current node to forward the packets with the identifier.

In an embodiment, the adjustment module includes:

a determination module configured to determine whether all the packets with the same identifier have been forwarded.

In a third aspect, a data forwarding apparatus in a Bluetooth Mesh network is provided according to embodiments of the present disclosure. The data forwarding apparatus includes:

a processor; and a memory configured to store instructions executed by the processor, where the processor is configured to execute the data forwarding method according to any one of the above description.

In summary, according to the present disclosure, switching is performed to transmit the forwarded data multiple times at different transmission rates, without changing the original Bluetooth protocol. In this way, the transmission distance difference between different transmission rates is used to achieve regional flood forwarding, thereby reducing a large number of flooding of device nodes in the network and avoiding network congestion, and improving the performance of the entire Bluetooth Mesh network.

BRIEF DESCRIPTION OF THE DRAWINGS

The above and other objects, features, and advantages of the present disclosure are apparent from the following description of embodiments of the present disclosure with reference to the drawings. In the drawings.

DETAILED DESCRIPTION OF EMBODIMENTS

The present disclosure is described below based on embodiments. However, the present disclosure is not limited to these embodiments. In the following description of the present disclosure, specific details are described. Those skilled in the art can fully understand the present disclosure without the description of these details. Well-known methods, processes, flows, elements and circuits are not described in detail in order to avoid obscuring the essence of the present disclosure.

In addition, those skilled in the art should understand that the drawings provided herein are for illustrative purpose, and are unnecessarily drawn to scale.

Unless explicitly indicated herein, the words "including", "comprising" and the like throughout the specification and the claims should be interpreted as inclusive rather than exclusive or exhaustive, that is, "including but not limited to".

In the description of the present disclosure, it should be understood that the terms "first", "second" and the like are only for illustrative purpose rather than construed as indicating or implying relative importance. In addition, in the description of the present disclosure, the term "multiple" or "a plurality of" indicates two or more unless otherwise specified.

With the update of BLE Special Interest Group protocol, more and more node devices have begun to support protocols over Bluetooth 5.0. For the protocols over Bluetooth core protocol 5.0, two modes are introduced in the Low Energy standard. The symbol rate in a first mode is twice that in the existing standard. The first mode and the existing standard both belong to the low energy un-encoding physical layer standard, since there is no error correction coding stage both inside the first mode and the existing standard. In the first mode, the data transmission rate is 1 Mbps and 2 Mbps. The second mode is referred to as a low energy coding physical layer standard, which has two coding modes: S=8 and S=2, where S is the number of symbols per bit. In the second mode, the data transmission rate is 125 Kbps (S=8), and 500 Kbps (S=2). According to the present disclosure, the two data transmission rates in the first mode are referred to as a first rate, and the two data transmission rates in the second mode are referred to as an coding rate Coded_rate. In following contents, the first rate may be any one of 1 Mbps and 2 Mbps, and the coding rate Coded_rate may be any one of 125 Kbps and 500 Kbps. In addition, under the same transmission power, the coding rate supports a farther transmission distance than the first rate, because of an excellent encoding ability and lower transmission rate of the coding rate. In the present disclosure, a transmission distance difference between the coding rate and the first rate is utilized to achieve regional flooding in the Bluetooth Mesh network.

Figure 2:
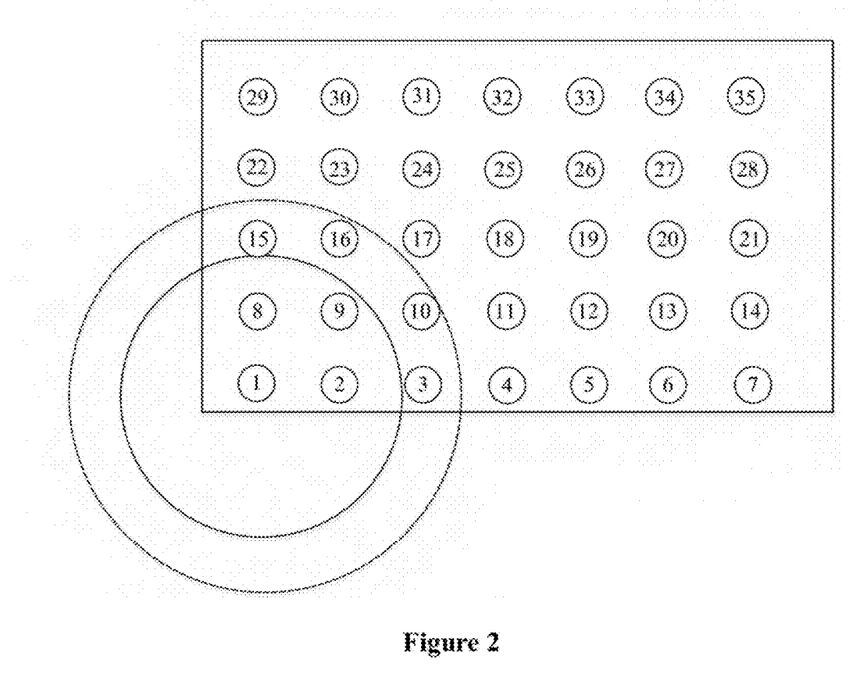
FIG. 2 is a schematic diagram illustrating a flood forwarding method in a Bluetooth Mesh network according to an embodiment of the present disclosure.

FIG. 2 is a schematic diagram illustrating a flood forwarding method in a Bluetooth Mesh network according to an embodiment of the present disclosure. The nodes in the FIG. 2 all adopt the Bluetooth 5.0 and above protocols, and support multi-rate mode. In this embodiment, description is given by taking an example where the first rate is 1 Mbps and the coding rate Coded_rate is 500 Kbps. Under the same transmission power, the two different transmission rates result in that each of nodes has two different transmission ranges, namely a first transmission range (shown by a solid line) and a second transmission range (shown in dashed line). The first transmission range corresponds to the first rate, and the second transmission range corresponds to the coding rate Coded_rate.

Specifically, when receiving a packet, a node in the network is required to determine whether a destination address of the packet is the same as an address of the node itself. If the destination address of the packet is the same as the address of the node, the node performs subsequent operations such as parsing and processing on the packet. If the destination address of the packet is different from the address of the node, the node is required to determine whether to forward the packet or not. For the convenience of description, each node that appears in the following description has an address different from destination address of packets, so the node needs to adjust a relay status, that is, forward (relay) the packet or discard (not to relay) the packet.

In an embodiment, when a node forwards a packet, the node forwards the packet 2N times using different transmission rates, where N is a positive integer. Specifically, the node forwards the packet N times at the first rate, and the same node forwards the packet N times at the coding rate Coded_rate. In an embodiment, the transmission rate used for forwarding the first N times is the first rate, and the transmission rate used for forwarding the next N times is the coding rate Coded_rate. It should be understood that N may be set based on signal quality requirements. Each packet is forwarded multiple times by the same node to avoid the packet loss in the process. It should be understood that other forwarding sequences, such as using the coding rate for the first N times, using the first rate for the next N times, or using the two rates alternately, are all within the protection scope of the present disclosure.

If the packets with the same identifier (ID) received by the node have different transmission rates, the node is adjacent to a node which should forward the packet, and does not need to forward the packet. If the packets with the same identifier (ID) received by the node only have a single transmission rate, the node enables a relay to forward the packet. That is, in an embodiment of the present disclosure, a node at an edge position within a transmission range corresponding to the coding rate enables the relay to forward packets. A node that is not at the edge position within a transmission range corresponding to the coding rate disables the relay, and thus, the node does not forward the packets.

Specifically, description is given by taking an example where N=3. First, a node 1 forwards a packet based on the above-mentioned rules. The packet is forwarded at the first rate for the first three times, and IDs of the packets forwarded three times are the same. Nodes 2, 8, and 9 (i.e., nodes adjacent to the node 1) are within a transmission range corresponding to the first rate, and thus the nodes 2, 8 and 9 receive the packets forwarded at the first rate. Then, the node 1 forwards the packet three times at the coding rate Coded_rate, and IDs of the packets forwarded three times are the same as those forwarded for first three times. Thus, nodes 2, 8 and 9 receive the packets forwarded at the coding rate Coded_rate. In addition, nodes 3, 10, 15, 16 (at an edge position of the corresponding transmission range) also receive packets forwarded at the coding rate Coded_rate. That is, the nodes 2, 3, 8, 9, 10, 15 and 16 are all within the transmission range corresponding to the coding rate Coded_rate. Therefore, due to the different transmission ranges under different transmission rates, the nodes 2, 8, and 9 receive the packets with the same ID which are transmitted at two different transmission rates, namely the first rate and the coding rate Coded_rate. However, the nodes 3, 10, 15, 16 receive the packets with the same ID which are transmitted at only one transmission rate, that is, the coding rate Coded_rate. Therefore, it may be determined that nodes 2, 8, and 9 are nodes adjacent to node 1, which do not need to forward packets. The nodes that only receive packets at a single rate, that is, nodes 3, 10, 15 and 16, are at the edge position of the transmission range corresponding to the coding rate, which need to forward packets until the node 1 has already forwarded all the packets with that ID. When the nodes 3, 10, 15, and 16 performs forwarding, they also use the above-mentioned forwarding mechanism, and continue to select nodes that are at the edge position within the transmission range corresponding to the coding rate for forwarding. This is repeated until the packet is forwarded to a target node.

It should be understood that the transmission range corresponding to the first rate of 2 Mbps is smaller than a transmission range corresponding to 1 Mbps; and the transmission range corresponding to the coding rate of 250 Kbps is larger than a transmission range corresponding to 500 Kbps. Therefore, when the packets are forwarded at different rates, the transmission ranges are also different, but the principle is the same as that described above, which is not described herein.

In this embodiment, the packet forwarded by the node adopts a fixed format. The format is compatible with the Bluetooth protocol. The format includes a flag bit, which indicates a transmission rate used for forwarding packet next time. The flag bit being a first value means that the first rate (i.e., 1 Mbps) is used to forward the packet next time; and the flag bit being a second value means that the coding rate Coded_rate is used to forward the packet next time. In addition, other nodes may be notified a reception of packets in time by using the flag bit, so as to avoid packet loss.

Figure 3:
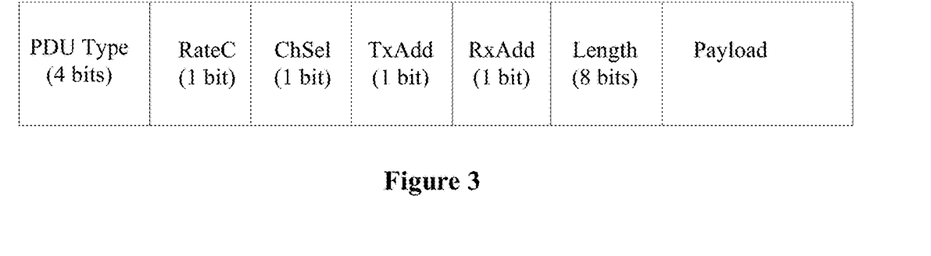
FIG. 3 is a diagram illustrating a format of a packet according to an embodiment of the present disclosure.

FIG. 3 is a diagram illustrating a format of a packet according to an embodiment of the present disclosure. As shown in FIG. 3, PDU Type field indicates a type of a packet, which has a length of 4 bits; and RateC field indicates a flag bit of a transmission rate, which has a length of 1 bit. When a packet is forwarded at the first rate, the flag bit of the transmission rate is the first value (for example, 0). When the packet is forwarded at the coding rate Coded_rate, the flag bit of the transmission rate is the second value (for example, 1). ChSel field indicates a channel algorithm flag, which has a length of 1 bit. TxAdd field indicates a type of an address of a transmitting terminal, which has a length of 1 bit. RxAdd field indicates a type of an address of a receiving terminal, which has a length of 1 bit. Length field indicates a length of a packet, which has a length of 8 bits. Payload field indicates actual data of a packet.

In an embodiment, one packet is forwarded by the same node N times at the first rate and N times at the coding rate Coded_rate. The transmission rate used for the first N times of forwarding is the first rate, and the transmission rate used for the next N times of forwarding is the coding rate Coded_rate. When the node transmits the packet for the Nth time at the first rate, the RateC field needs to be set to the second value, to indicate that the coding rate Coded_rate is used for forwarding the packet next time. In this way, other nodes immediately switches the reception rate to the coding rate Coded_rate based on the indication in the field RateC after receiving the packet. It should be understood that as long as the first value and the second value are different, for example, the first value may be 1 and the second value may be 0.

It should be understood that, in other embodiments, the flag bit indicating the transmission rate may also use RFU field, which indicates the default, to indicate one of the transmission rates. For example, when a packet is forwarded at the first rate, RFU field is added to indicate that the packet is forwarded at the first rate instead of the coding rate. When the node transmits the packet for the Nth time at the first rate, RateC field is added. At this time, the value in RateC field may be arbitrary value, indicating that the coding rate Coded_rate is used to forward the packet next time. In this way, other nodes immediately switches the reception rate to the coding rate Coded_rate based on the indication in the field RateC after receiving the packet. Of course, RFU field may also be used to indicate the coding rate, and RateC field may be used to indicates the first rate.

Figure 4:
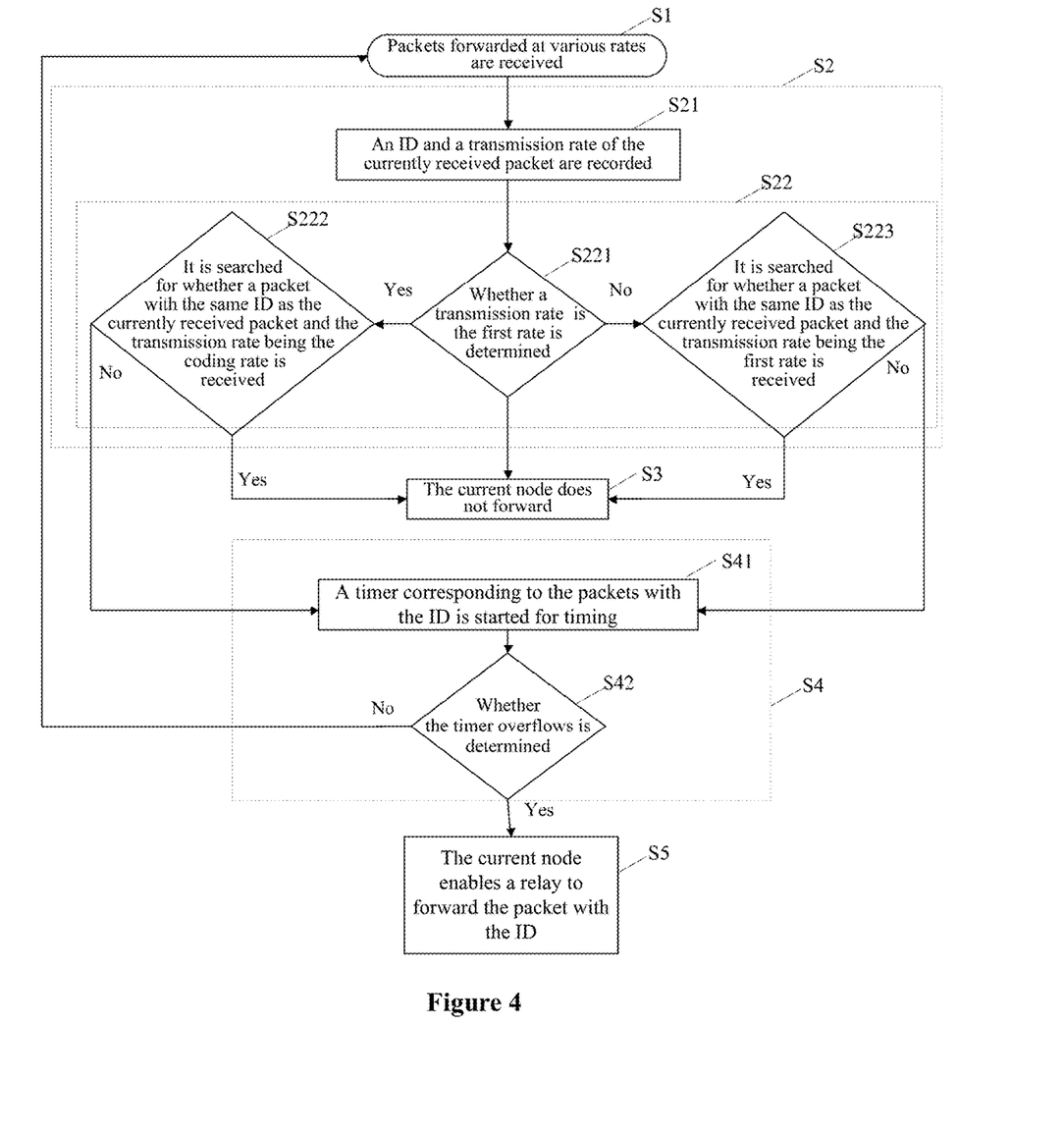
FIG. 4 is a flowchart illustrating a flood forwarding method in a Bluetooth Mesh network according to an embodiment of the present disclosure.

FIG. 4 is a flowchart illustrating a flood forwarding method in a Bluetooth Mesh network according to an embodiment of the present disclosure.

In step S1, packets forwarded at various rates are received.

In step S2, a relay state is adjusted based on the transmission rates of the received packets with the same identifier (ID). After the packets with the same ID are all forwarded, if the received packets with the same ID have different transmission rates, the current node disables the relay to discard the packets, that is, the current node does not forward the packets with the same ID. If the received packets with the same ID only have a single transmission rate, the current node enables the relay to forward the packets.

Specifically, step S2 further includes the following steps.

In step S21, an ID and a transmission rate of the currently received packet are recorded.

In step S22, the transmission rate of the currently received packet is compared with a transmission rate corresponding to the received packet with the same identifier as the currently received packet, and whether the current node needs to forward the packet with the identifier is determined based on a comparison result.

In an embodiment, if the transmission rate corresponding to the received packet with the identifier is different from the transmission rate of the currently received packet, the current node does not forward the packet with the identifier. If the transmission rate corresponding to the received packet with the identifier is the same as the transmission rate of the currently received packet, whether or not to forward the packet with the identifier is determined according to whether all the packet with the identifier has been forwarded. If it is determined that all the packets with the identifier have not been forwarded, a transmission rate of the next received packet with the identifier is compared with the transmission rate corresponding to the received packet with the identifier. If it is determined that all the packets with the identifier have been forwarded, it is indicated that the transmission rates of the packets with the identifier are the single transmission rate, and the current node is instructed to forward the packet with the identifier.

Specifically, step S22 may further include the following steps.

In step S221, whether a transmission rate of the received packet is the first rate is determined. If the transmission rate of the received packet is determined to be the first rate, the process proceeds to step S222. If the transmission rate of the received packet is not determined to be the first rate, the process proceeds to step S223.

In step S222, it is searched for whether a packet with the same ID as the currently received packet and the transmission rate being the coding rate is received. If the packet with the same ID as the currently received packet and the transmission rate being the coding rate has been received, it is indicated that the received packets with the same ID have been transmitted at different transmission rates, the process proceeds to step S3; and if the packet with the same ID as the currently received packet and the transmission rate being the coding rate is not received, the process proceeds to step S4.

In step S223, it is searched for whether a packet with the same ID as the currently received packet and the transmission rate being the first rate is received. If the packet with the same ID as the currently received packet and the transmission rate being the first rate is received, it is indicated that the received packets with the same ID have been transmitted at different transmission rates, the process proceeds to step S3; and if the packet with the same ID as the currently received packet and the transmission rate being the first rate is not received, the process proceeds to step S4.

In step S3, the current node does not forward (not to relay). That is, the packets with the same ID are directly discarded by the current node.

In step S4, whether the packets with the ID have already been forwarded is determined. If it is determined that the packets with the ID have not been forwarded, the process proceeds to step S1. If it is determined that the packets with the ID have already been forwarded, it is indicated that the transmission rates of the packets with the ID are the single transmission rate, and the node enables a relay to forward the packet with the ID.

If the packets with the ID are forwarded 2N times by the same node, it is indicated that the packets with the ID have already been forwarded.

In an embodiment of the present disclosure, whether all the packets with the same ID have already been forwarded is determined by the following method. That is, step S4 includes the following steps.

In step S41, a timer corresponding to the packets with the ID is started for timing.

The preset time of the timer is determined by the number of times 2N that a node forwards the packet with the ID. Specifically, the preset time is set to be greater than a time period for (2N−1) times forwarding the packet with the ID.

It should be understood that, after the corresponding timer starts to time, for packets with the same ID, the timer will not be affected by executing step S41, and the timer continues to time. If the received packets have different ID, another timer is starting for timing.

In step S42, whether the timer overflows is determined. If it is determined that the timer overflows, the process proceeds to step S5. If it is determined that the timer does not overflow, the process returns back to step S1. When the timing time is greater than a preset time period, the timer overflows, that is, it is indicated that all the packets with the ID have been forwarded.

In step S5, the current node enables a relay to forward the packet with the ID.

For a node that is not at the edge position of the transmission range, before the timer overflows, the node may detect that the packets with the same ID are received at two different transmission rates. Thus, it is determined that the node does not need to forward the packets. For a node at the edge position of the transmission range, the node starts the corresponding timer at least after the node receives the packet at the coding rate for the N+1th time, and then performs forwarding until the timer overflows.

In an embodiment, step S4 may also be performed directly after step S21. After all the packets with the same ID have been forwarded, it is searched for whether the transmission rate corresponding to the received packets with the same ID is a single transmission rate or different transmission rate, so as to determine whether the current node forwards the packets. The preset time of the timer is determined by the number of times 2N that a node forwards the packet with the ID. Specifically, the preset time is set to be greater than a time period for (2N−1) times forwarding the packet with the ID.

According to an embodiment of the present disclosure, a data forwarding apparatus in a Bluetooth Mesh network is provided. It should be understood that, in order to achieve the above-mentioned functions, the data forwarding apparatus according to an embodiment of the present disclosure includes hardware and/or software modules which perform various functions. That is, the data forwarding apparatus may implement the above-mentioned steps in the form of hardware, software or a combination of both, which depends on the specific application and design constraints of the technical solution.

Figure 5:
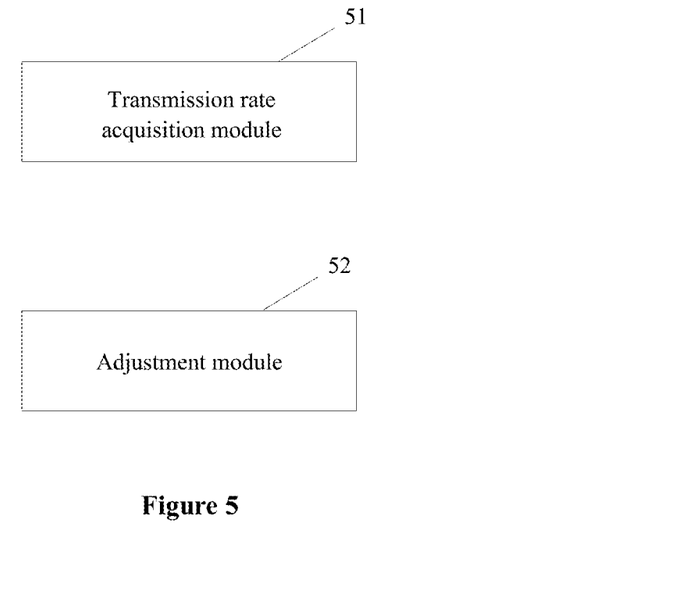
FIG. 5 is a diagram illustrating a data forwarding apparatus in a Bluetooth Mesh network according to an embodiment of the present disclosure.

FIG. 5 is a diagram illustrating a data forwarding apparatus in a Bluetooth Mesh network according to an embodiment of the present disclosure. The data forwarding apparatus 5 includes a transmission rate acquisition module 51 and an adjustment module 52. The transmission rate acquisition module 51 is configured to acquire IDs of currently received packets and transmission rates corresponding to the currently received packets. The adjustment module 52 is configured to adjust a relay state based on the transmission rates of the currently received packets with the same ID. The adjustment module 52 adjusts the relay state in the following manner: if the received packets with the same identifier have different transmission rates, disabling a relay of a current node to discard the packets with the identifier; if the received packets with the same identifier only have a single transmission rate, enabling the relay of the current node to forward the packets with the identifier. The adjustment module 52 further includes a determination module. The determination module is configured to determine whether all the packets with the same ID have been forwarded. After all the packets with the ID have been forwarded, if all the packets with the ID only have a single transmission rate, and thus, the current node enables the relay.

According to another aspect of the embodiment of the present disclosure, a data forwarding apparatus in a Bluetooth Mesh network is also provided. The apparatus includes: a processor, and a memory configured to store instructions executed by the processor, where the processor is configured to execute above-mentioned data forwarding method by executing the instructions.

The preferred embodiments of the present disclosure are described above and are not intended to limit the present disclosure. Those skilled in the art can make various modifications and variations to the present disclosure. Any modifications, equivalent substitutions and improvements made within the spirit and the principle of the present disclosure are within the protection scope of the present disclosure.

The invention claimed is:

1. A data forwarding method in a Bluetooth Mesh network, comprising:
receiving packets forwarded at different transmission rates;
adjusting a relay state of a current node based on transmission rates of received packets with a same identifier; and
determining whether the received packets with the same identifier have different transmission rates;
if the received packets with the same identifier only have a single transmission rate, enabling a relay by the current node to forward the received pack with the identifier; and if the received packets with the same identifier have different transmission rates, disabling the relay by the current node to discard the received packets with the identifier.

2. The data forwarding method according to claim 1, wherein a packet is repeatedly forwarded 2N times by a same node at different transmission rates to avoid packet loss during transmission, wherein N is a positive integer.

3. The data forwarding method according to claim 2, wherein the packet is forwarded N times by the same node at a first rate, and forwarded N times by the same node at a coding rate.

4. The data forwarding method according to claim 3, wherein the packet is forwarded N times by the same node at the first rate, and then forwarded N times by the same node at the coding rate.

5. The data forwarding method according to claim 3, wherein the first rate is greater than the coding rate, and a transmission range of the received packets forwarded at the first rate is smaller than a transmission range of the received packets forwarded at the coding rate.

6. The data forwarding method according to claim 1, wherein a format of the received packets comprises a flag bit, wherein the flag bit indicates a transmission rate of the current node used to forward the received packets next time.

7. The data forwarding method according to claim 6, wherein the flag bit being a first value indicates that a first rate is used to forward the received packets next time; the flag bit being a second value, it is indicated that a coding rate is used when forwarding the received packets next time.

8. The data forwarding method according to claim 6, wherein a default field is used as the flag bit to indicate that one of a first rate and a coding rate is used to forward the received packets next time.

9. The data forwarding method according to claim 6, wherein when a value of the flag bit in the received packets sent by the current node is changed, other node switches a reception rate to a transmission rate indicated by the flag bit after receiving the received packets from the current node.

10. A data forwarding method in a Bluetooth Mesh network, comprising:
   receiving packets forwarded at different transmission rates;
   adjusting a relay state of a current node based on transmission rates of received packets with a same identifier;
   recording an identifier and a transmission rate of a currently received packet;
   comparing the transmission rate of the currently received packet and a transmission rate corresponding to the received packets with the same identifier as the currently received packet; and
   determining, based on a comparison result, whether the current node is to forward the received packets with the identifier.

11. The data forwarding method according to claim 10, further comprising:
   if the transmission rate corresponding to the received packets with the identifier are different from the transmission rate of the currently received packet, forwarding no packet with the identifier by the current node;
   if the transmission rate corresponding to the received packets with the identifier are the same as the transmission rate of the currently received packet, determining whether the received packets with the identifier are to be forwarded or not, based on a determination of whether the received packets with the identifier have been forwarded.

12. The data forwarding method according to claim 11, wherein if it is determined that the received packets with the identifier have not been forwarded, a transmission rate of a next received packet with the identifier is compared with the transmission rate corresponding to the received packets with the identifier;
   if it is determined that the received packets with the identifier have been forwarded, it is indicated that the transmission rate of the received packets with the identifier is a single transmission rate, the current node is instructed to forward the received packets with the identifier.

13. The data forwarding method according to claim 10, further comprising:
   when the transmission rate of the currently received packet is a first rate, searching for whether a packet with the same identifier as the currently received packet and the transmission rate being a coding rate is received;
   if the packet with the same identifier as the currently received packet and the transmission rate being the coding rate is found, forwarding no packet with the identifier by the current node; and
   if no packet with the same identifier as the currently received packet and the transmission rate being the coding rate is found, determining whether the received packets with the identifier have been forwarded.

14. The data forwarding method according to claim 10, further comprising:
   when the transmission rate of the currently received packet is a coding rate, searching for whether a packet with the same identifier as the currently received packet and the transmission rate being a first rate is received;
   if the packet with the same identifier as the currently received packet and the transmission rate being the first rate is found, forwarding no packet with the identifier by the current node; and
   if no packet with the same identifier as the currently received packet and the transmission rate being the first rate is found, determining whether the received packets with the identifier have been forwarded.

15. The data forwarding method according to claim 11, wherein when the received packets with the identifier are forwarded 2N times by the same node, it is indicated that the received packets with the identifier have been forwarded, wherein N is a positive integer.

16. The data forwarding method according to claim 11, wherein determining whether the received packets with the identifier have been forwarded comprises:
   starting a timer corresponding to the received packets with the identifier for timing;
   if the timing is greater than a preset time period of the timer, indicating that the received packets with the identifier have been forwarded.

17. The data forwarding method according to claim 16, wherein the preset time period of the timer is set to be greater than a time period for forwarding the received packets with the identifier (2N−1) times.

18. A data forwarding apparatus in a Bluetooth Mesh network, comprising:
   a processor; and
   a memory which stores instructions executed by the processor; and
   the processor is configured to execute the instructions, wherein when the instructions are executed, the data forwarding apparatus is configured to acquire identifiers of currently received packets and transmission rates corresponding to the currently received packets;

adjust a relay state based on the transmission rates of the currently received packets with a same identifier;

if the currently received packets with the same identifier have different transmission rates, disable a relay by a current node to discard the currently received packets with the identifier; and if the currently received packets with the same identifier only have a single transmission rate, enable the relay by the current node to forward the currently received packets with the identifier.

19. The data forwarding apparatus according to claim 18, wherein when the instructions are executed, the data forwarding apparatus is configured to:

determine whether all packets with the same identifier have been forwarded.

\* \* \* \* \*